April 13, 1965

R. B. SHORES 3,178,614

ELECTRIC CIRCUIT BREAKER

Filed July 16, 1962

INVENTOR:
RONALD B. SHORES,
BY William Freedman
ATTORNEY.

April 13, 1965　　　R. B. SHORES　　　3,178,614
ELECTRIC CIRCUIT BREAKER
Filed July 16, 1962　　　　　　　　　　　2 Sheets-Sheet 2

INVENTOR:
RONALD B. SHORES,
BY William Freedman
ATTORNEY.

United States Patent Office 3,178,614
Patented Apr. 13, 1965

3,178,614
ELECTRIC CIRCUIT BREAKER
Ronald B. Shores, West Chester, Pa., assignor to General Electric Company, a corporation of New York
Filed July 16, 1962, Ser. No. 209,991
8 Claims. (Cl. 317—15)

This invention relates to an electric circuit breaker of the type that has its contacts located within a metallic housing at high potential. More particularly, the invention relates to a circuit breaker of this type that has its main current transformer equipment mounted in a single enclosure at one side of the contacts of the breaker.

An example of this type of circuit breaker is illustrated in U.S. Patent No. 2,931,951, Wilson, assigned to the assignee of the present invention. In the Wilson circuit breaker, the main current transformer secondary windings are mounted in a single insulated enclosure disposed at one electrical side of the breaker contacts. These secondary windings are connected in a suitable protective circuit capable of sensing the presence of a fault external to the circuit breaker and of initiating opening of this and other circuit breakers in response to the fault. Faults to ground internal to the circuit breaker are sensed by an auxiliary secondary winding mounted about the insulated enclosure of the current transformer. Upon sensing such an internal fault, this auxiliary secondary winding initiates opening of the faulted circuit breaker and the breakers at opposite electrical sides thereof so as to isolate the fault from the remainder of the power system.

Although the insulation in the Wilson type circuit breaker is so coordinated that it is extremely unlikely that a fault could occur from its high voltage tank to some external point, some circuit breaker users may wish to make special accommodations for a fault of this particular type. To explain further, the current transformer equipment of Wilson patent will relay such a fault as an external fault. In other words, the current transformer equipment responds to such a fault by producing opening of the faulted circuit breaker and the breakers at one electrical side only of the faulted circuit breaker. Some circuit breaker users, however, prefer to treat this particular type of fault in the same manner as an internal fault. In other words, they prefer to open the circuit breakers at both electrical sides of the faulted breaker, as well as the faulted breaker, in response to such a fault.

To accommodate this preference, it has been proposed that high voltage main current transformers be provided in suitable insulating housings at both electrical sides of the circuit breaker and that the secondaries of these current transformers be connected in their respective protective circuits in th well-known electrically "overlapping" relationship. Such a system can perform the desired function of relaying faults from the high voltage tank as internal faults. But this is an unduly expensive solution to the problem inasmuch as the high voltage current transformers are quite expensive. This follows from the fact that in each of the two current transformers, insulation is required capable of withstanding the full voltage between line and ground, and such insulation is quite costly.

An object of my invention is to provide current transformer means capable of relaying such faults from the high voltage tank as internal faults and yet requiring no appreciable high voltage insulation beyond that which is already present in the circuit breaker disclosed in the Wilson patent.

In carrying out my invention in one form, I provide a circuit breaker assembly that comprises a tank at high potential. Two pairs of separable contacts are disposed within the tank for effecting circuit interruption inside the tank. A pair of insulating bushings are provided projecting into the tank for carrying current to and from the contacts. At one electrical side of the contacts, a current transformer primary winding is provided. Coupled to this primary winding are first and second secondary windings for defining the boundaries of a pair of protective zones, one of which includes the power circuit at one side of the circuit breaker and the other of which includes the power circuit at the other side of the circuit breaker. Third and fourth current transformer secondary windings having magnetic circuits respectively surrounding the two insulating bushings are provided. These third and fourth windings are connected in a differential protective circuit that is capable of responding to a predetermined difference in the currents entering and leaving said tank through said bushings to cause opening of the circuit breaker in response to this difference in currents. The secondary windings about the bushing are at substantially the potential of the tank.

For a better understanding of the invention, reference may be had to the following specification taken in conjunction with the accompanying drawings, wherein.

Figure 1:
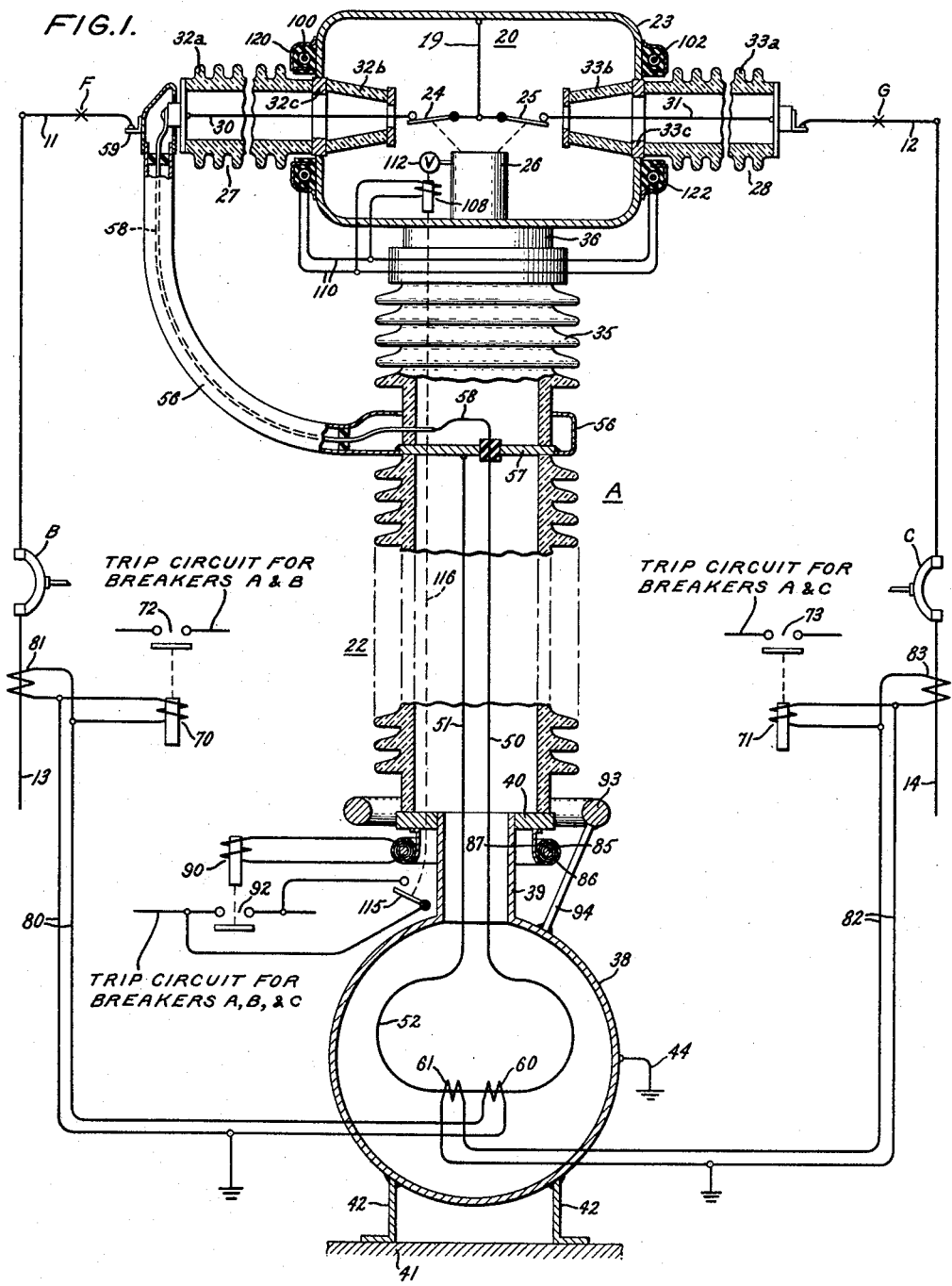
FIG. 1 is a side elevational view partly in section and partly schematic showing a circuit breaker assembly embodying one form of my invention.

Referring now to FIG. 1, there is shown a circuit breaker A of the type disclosed in the above-mentioned Wilson patent. This circuit breaker comprises a circuit interrupter 20 supported atop an enclosure 22. The interrupter 20 is preferably of the gas blast type and comprises a metallic tank 23 containing pressurized gas. Mounted within the tank 23 are two pairs 24 and 25 of series-connected, simultaneously-operable contacts. The pairs of contacts are operated by means of a pneumatically-controlled operating mechanism 26 disposed within the tank. The junction between the two pairs of contacts is preferably electrically connected to the tank 23 by means of a conductor 19 so that the tank is at line potential when the contacts are closed and is at preferably a mid-potential when the contacts are open. The contacts and the mechanism can be of any suitable construction but are preferably of the construction shown and claimed in Patent No. 2,783,338, Beatty, assigned to the assignee of the present invention.

For carrying current to and from the contacts and for supporting the outer contact of each pair of contacts, a pair of high voltage terminal bushings 27 and 28 projecting through opposite ends of the metallic housing 23 are provided. The terminal bushing 27 comprises a rigid conductor shown schematically at 30 and an outer shell made up of parts 32a, 32b and 32c. Parts 32a and 32b are preferably porcelain cylinders enclosing the conductor 30 at its respective ends, and part 32c is a tubular metallic adapter suitably clamped between the porcelain cylinders and supporting the porcelain cylinders on the tank 23. The insulating shell 32a, 32b, 32c supports the conductor 30 and also insulates it from the housing 23 when the circuit interrupter is open. The other bushing 28 is identical to bushing 27 and therefore will not be described in detail except to mention that it comprises a rigid conductor 31 and an insulating shell 33a, 33b and 33c.

The enclosure 22 that supports the interrupter 20 comprises a tubular porcelain column 35 provided with suitable fastening structure 36 at its top for rigidly securing the metallic housing 23 to the top of the porcelain column 35. At the lower end of the porcelain column 35, a metallic tank 38 is provided. The upper portion of this metallic tank comprises a tubular throat 39 which is suitably fastened to an annular plate 40, that, in turn, is suitably bonded to the porcelain column 35. Together the porcelain column 35 and the tank 38 form an enclosure 22 that is rendered gas-tight by suitable seals and gaskets provided at all of its joints. The space within the enclosure 22 is preferably isolated from the pressurized gas within the metallic housing 23 of the interrupter.

One of the functions of the enclosure 22 is to support the circuit interrupter 20 on a base 41. For this purpose a pair of L-shaped legs 42 are suitably secured to the tank 38 near its bottom and these legs are secured to the base 41. The tank 38 thus supports the insulating column 35, which, in turn, supports the interrupter 20. The tank 38 is solidly connected to ground by a connection 44 provided at a suitable location below the throat 39 of the tank. The porcelain column 35 provides for electrical isolation between the high voltage parts of the circuit breaker and the grounded tank 38.

A second function of the enclosure 22 is to serve as a housing for the current transformer windings of the circuit breaker assembly. To this end, the enclosure 22 is filled with a suitable insulating fluid in which the various components of the current transformer are disposed. The primary conductor of the current transformer is of a loop-shape configuration and comprises a pair of arms 50 and 51 extending through the porcelain column 35 into the tank 38 where their lower ends are joined by a generally toroidial-shaped conducting element 52. The arm 51 is connected to one terminal 59 of the circuit breaker by means of a conductor 56 and a conductive plate 57 extending across the insulating column 35. The other arm 50 of the current transformer primary is connected to the conductor 30 of the lead-in bushing 27 by means of a conductor 58 extending therebetween. The conductor 58 is suitably insulated from the conductive plate 57 and from the conductor 56. Preferably the conductor 56 is a tube that surrounds the conductor 58 in insulated, coaxial relationship, as is described in more detail in the aforementioned Wilson patent. Preferably, also, the arm 51 is a tube that surrounds the other arm 50 in coaxial relationship. For the sake of simplicity, however, the arms 50 and 51 are shown as single line conductors. It will be apparent that the current transformer primary 51, 52, 50 is connected in series with the contacts 24, 25 of the circuit breaker so that current flowing through the contacts 24, 25 of the circuit breaker normally flows through the current transformer primary winding.

The secondary windings of the current transformer assembly are shown at 60 and 61 disposed within the tank 38. Each of these secondary windings 60 and 61 is inductively coupled to the primary conductor 50, 52, 51 so that it can sense the amount of current flowing through the portion of the primary winding that it encompasses. The secondary windings 60 and 61 are at ground potential, and sufficient insulation (not shown) is present between the primary conductor 50, 52, 51 and the secondary windings 60 and 61 to withstand full line-to-ground voltage. The leads from the secondary windings 60 and 61 are brought out of the tank through suitable sealed and insulated openings provided at the bottom of the tank 38.

To provide an understanding of how the secondary windings 60 and 61 provide protection in a typical power system, the circuit breaker A has been shown connected in a typical power system with its secondary windings 60 and 61 connected in a conventional differential relaying system. In the power system of FIG. 1, the circuit breaker A serves as a bus-tie breaker interconnecting a pair of bus sections 11 and 12. In the usual electric power system, a plurailty of electric circuits, which may be either feeder or distribution circuits for respectively supplying electrical energy to or from the bus, are connected to each of the bus sections, but for simplicity, I have shown only a single circuit 13 connected to bus section 11 and a single circuit 14 connected to bus section 12. Circuit 13 is interconnected to bus section 11 through a remote circuit breaker B, and circuit 14 is interconnected to the bus section 12 through a remote circuit breaker C. For the purposes of this description, these remote circuit breakers may be of a conventional construction and, hence, are shown in schematic form only. It is desirable to isolate, or deenergize, only the faulty portion of the electrical power system upon the occurrence of a fault condition in order to permit uninterrupted service to be maintained over the remainder of the system. To this end, if a fault should occur in an external portion of the circuit extending between the breakers, only the breakers at the terminals of the faulted external circuit portion should open. For example, should a fault occur at F, it would be necessary to open only breakers A and B, whereas breaker C should desirably remain operatively connected to its bus section. Thus, circuit 14, if a feeder circuit, could continue to supply power through bus section 12 to any other circuit (not shown) suitably connected to bus section 12. Such other circuit would ordinarily be connected to the bus section 12 through a circuit breaker (not shown) controlled by a suitable current transformer winding connected into the hereinafter-described protective circuit 82 in a conventional manner, such as is disclosed in U.S. Patent 2,804,576, Coggeshall et al., assigned to the assignee of the present invention. In a corresponding manner, if a fault should occur at G instead of F, it would be necessary to open only breakers A and C, whereas breaker B should remain operatively connected to its bus section 11 whereby to permit this bus section to remain energized.

For producing the desired opening of the breakers once the location of the fault has been determined, differential relays 70 and 71 are provided. Differential relay 70 includes normally-open contacts 72, which, when closed, establish a tripping circuit for circuit breakers A and B. Similarly differential relay 71 includes normally-open contacts 73 which, when closed, establish a tripping circuit for circuit breakers A and C. To those skilled in the art it will be obvious that each of the circuit breakers controlled by a particular tripping circuit may have an electromagnetically-controlled latch which is released to effect breaker opening in response to current flow through this particular tripping circuit. Accordingly, for the purposes of simplifying this description, these conventional details of the tripping circuits have been omitted.

Energization and operation of the relay 70 is effected from a differential protective circuit 80 including the current transformer secondary winding 60 of the breaker A and the current transformer secondary winding 81 of the breaker B. Each of these secondary windings 60 and 81 is energized in accordance with the value of current flowing in the portion of the primary conductor about which each secondary winding is disposed. As is well known in the art, the secondary windings are connected in such a manner that when these primary current values are vectorially equal, current merely circulates between the windings 60 and 81 of the protective circuit 80, as a result of which the coil of relay 70 receives no effective current and remains deenergized. However, if these primary current values become unequal by a vector difference exceeding a predetermined amount, sufficient current will flow through the coil of relay 70 to operate the relay, thereby to close its contacts 72 and establish a trip circuit for breakers A and B. This equal primary current condition will exist so long as no fault is present in the zone of the power circuit extending between windings 60 and 81. However, should a fault, such as at F, occur in this zone, the current flowing into the zone through one of the primary conductor portions would no longer be vectorially equal to the current flowing out of the zone through the other primary conductor portion. The resulting vector difference would produce a current flow in the differential protective circuit 80 which would be such as to operate the differential relay 70 so as to effect tripping of breakers A and B. Thus, the differential relay 70 will operate in response to any fault occurring within the protected zone of the power circuit extending between the windings 60 and 81. Differential protective circuits of this general kind are well known, and may include either a direct connection between the current transformer windings, as is shown, or may alternatively include pilot wires or some other conventional signalling channel interconnecting the windings.

Similarly, energization of the other differential relay 71 is effected from a differential protective circuit 82 including the current transformer windings 83 and 61. The winding of relay 71 is connected in its protective circuit in the same manner as described with respect to relay 70, so that should a fault occur in the protected zone of the power circuit extending between windings 83 and 61, such as at G, the relay 71 would operate to close and thereby trip breakers A and C.

If a fault should occur internally of the circuit breaker assembly A, rather than externally as described hereinabove, it could possibly impair the interrupting ability of the circuit breaker A to such an extent that this breaker could not interrupt the current flowing into the fault. Assuming that the interrupting ability of the breaker A is so impaired, it would be necessary to open the breakers B and C connected to both sides of the breaker A in order to clear and isolate the fault.

To enable the relaying system to distinguish between a fault internal to the circuit breaker A and one external to the circuit breaker, an auxiliary current transformer winding 85 is provided. This auxiliary current transformer winding corresponds in structure and operation to a similarly designated current transformer winding in the aforementioned Wilson patent. This auxiliary or third current transformer winding encircles both conductors, or arms, 50 and 51 of the current transformer primary winding. As shown in FIG. 1, this third winding 85 is disposed externally of the enclosure 22 in the region of the throat 39 of the tank 38 and is supported by suitable means 87 projecting outwardly from the throat 43. Preferably, this third winding 85 is wound about an annular magnetic core 86 encircling both the throat portion 43 of tank and the two arms 50 and 51 of the primary winding. The turns of the winding 85 are insulated from each other and from the core 86 and the support 87 in a conventional manner. In certain portions of the present application, the core 86 is referred to as the magnetic circuit of the winding 85.

The coil of a relay 90 is connected across the terminals of this winding 85 so that the relay coil can be energized from the winding 85. When a net current exceeding a predetermined amount flows through the region encompassed by the magnetic circuit, or core, 86, sufficient current is induced in the current transformer winding 85 to effect operation of the relay 90. Operation of the relay 90 closes a set of contacts 92 to complete a suitable trip circuit for the breakers A, B, and C.

So long as the primary circuit 50, 51, 52 of the current transformer assembly is sound, the winding 85 will not be effectively energized inasmuch as no net current is flowing in a path encompassed by its core 86. In this regard, any current entering the core region through one of the conductors, say 50, is effectively cancelled out by current leaving the core region through the other conductor 51. However, should the primary conductor 50, 51, 52 develop a fault to ground, say within the tank 38, the currents entering and leaving the region of the core 86 would no longer cancel out each other, and thus the winding 85 would be effectively energized. This would cause operation of the relay 90, which, in turn, would trip the circuit breakers A, B, and C, thus effectively isolating the fault in the desired manner. It will be apparent that for any fault to ground occurring within the tank 38, irrespective of its particular location, the windings 85 will be energized to effect tripping of the breakers A, B, and C, as is desired.

In addition to being able to detect a fault occurring from the primary conductor 51, 52, 50, within the tank 38, the current transformer winding 85 is able to detect any faults which might occur to ground from the conductors 50 and 51 within the porcelain column 35. Whether such faults followed a path to ground via the internal surface of the porcelain column 35 or through the gaseous insulator directly to the throat 39 of the metallic tank 38, the path would still be disposed internally of the core of the third current transformer winding 85. As a result, there would be net current flowing internally of the current transformer winding 85 and such current would energize the winding 85 causing it to produce operation of the relay 90 and resultant opening of the breakers A, B, and C, all as desired.

To insure that substantially all faults to ground occurring internally to the current transformer assembly follow a path disposed internally of the third current transformer winding 85, the tank 42 is connected to ground only at points beneath the current transformer winding 85. Thus, there is no significant likelihood of internal fault currents bypassing the third current transformer winding 85.

Any fault that might occur externally to the insulating column 35 from the terminal structure 56, 57 of the primary winding of the main current transformer to ground, I prefer to relay as an external fault in the zone of the differential relay 70. To this end, a shield 93 is provided encompassing the auxiliary current transformer winding 85 and electrically interposed between the grounded components of the circuit breaker assembly (including the winding 85) and substantially all the high voltage parts of the assembly that are susceptible to external faults. This shield 93 is connected to ground only by conductive straps 94 disposed externally to the core, or magnetic circuit, of the current transformer winding 85. As a result of this construction, external faults along the insulating column 35 are prevented from following a breakdown path to ground disposed internally of the magnetic circuit of the current transformer winding 85. Substantially all faults in the region of the current transformer winding 85 will be to shield 93 rather than to the winding 85 or to the conductive parts 39, 40 disposed internally of the winding, and such faults will be directed to ground through the conductive straps 94 disposed externally to the current transformer winding 85 and its core 86, thus effectively bypassing the winding 85 and the core 86. As a result, only the one differential relay 70 in whose operating zone the external fault occurs operates in response to such fault. Since the interrupting ability of the breaker A would normally not be impaired by such an external fault, it would ordinarily still be capable of isolating the fault from the circuit 12 at the other side of the breaker A, thereby allowing uninterrupted service to be maintained over such circuit at the other side of the breaker.

Although the insulation in the disclosed circuit breaker is so coordinated that it is extremely unlikely that a fault could occur from the high voltage tank 23 to some external point, some circuit breaker users may wish to make special accommodations for a fault of this particular type. To explain further, the current transformer equipment described up to this point would treat such a fault as an external fault in the zone of differential relay 71 since such fault would be from the portion of the power circuit extending between the current transformer secondary windings 61 and 83. Accordingly, the relaying system, as described up to this point, would respond to this fault by opening breakers A and C. There is a possibility, however, that breaker A might not be able to clear this fault and isolate it from the power circuit 11 at its left-hand side since only one break of the multi-break circuit breaker A is disposed between the fault and the power circuit 11. Some circuit breaker users may therefore wish to treat a fault from the tank 23 as a fault requiring opening of the breakers B and C at both electrical sides of breaker A. To accommodate this preference, I have provided two current transformer secondary windings 100 and 102. A single point on each of these two windings 100 and 102 is connected to the tank 23 of the interrupter in a suitable manner so that both windings are normally at the same voltage as the tank. Each of these windings is wound in a conventional manner about its own annular magnetic core, which is also at the same voltage as the tank by virtue of a suitable connection (not shown) between the tank 23 and the core. The turns of each of the windings 100 and 102 are insulated from each other and from the core in a conventional manner.

Each of the secondary windings 100 and 102 is energized in accordance with the value of current flowing in the portion of the primary circuit conductor about which each secondary winding is disposed. For example, winding 100 is energized in accordance with the value of current flowing through conductor 30, and winding 102 is energized in accordance with the value of current flowing through conductor 31. The circuit breaker A has an operation-initiating coil 108 which is arranged to be operated when the vector difference between the current flowing through the primary conductors 30 and 31 exceeds a predetermined amount. For operating the coil 108 in this manner, the two secondary windings 100 and 102 are connected in a differential circuit 110. This differential circuit is of a conventional type in which current merely circulates between the windings 100 and 102 so long as the currents flowing through primary conductors 30 and 31 are vectorically equal. This results in no effective current being received by the coil 108 connected across the differential circuit during the time the primary currents are equal. However, if these primary currents become unequal by a vector difference exceeding a predetermined amount, sufficient current will flow through the coil 108 to operate it, and thereby initiate opening of the breaker A. The equal primary current condition will exist so long as no fault is present in the zone of the primary circuit extending between the windings 100 and 102. However, should a fault develop in this zone, say from the tank 23 to some other point outside the zone, the current flowing into the zone through one of the primary conductors 30 or 31 would no longer be equal to the current flowing out of the zone through the other primary conductor. The resulting vector difference would produce a current flow in the differential protective circuit 110 which would be such as to operate the coil 108 so as to effect tripping of the circuit breaker A. It will be apparent that the tank 23 is in the zone between the two secondary windings 100 and 102 since it is connected to the primary circuit only at a point between the two pairs of contacts 24 and 25. As a result, any fault from the tank 23 appears to the secondary windings 100 and 102 as a fault from the point between the two pairs of contacts 24 and 25. This is so whether the fault from the tank 23 is to an adjacent phase or is an external flashover of an entrance bushing 32a or 32b.

Operation of the coil 108 causes a valve 112 to open, thereby admitting pressurized air from the tank to the operating mechanism 26. This pressurized air causes the mechanism 26 to operate to open the contacts 24, 25 of the circuit breaker A. The valve 112 can be of any suitable form but is preferably of the type disclosed in the aforementioned Beatty Patent 2,783,338 and is therefore shown schematically in the drawing. It will be apparent that this tripping of circuit breaker A, in the illustrated embodiment, can be effected solely by current derived from the main power line through the differential circuit 110. No other source of electrical energy is needed for such tripping of circuit breaker A.

If the fault from the tank that initiated operation of the coil 108 is to be treated in the same manner as an internal fault, then the breakers B and C should be tripped as well as the breaker A. This is accomplished by operating a set of contacts 115 at ground potential by means of an operating rod 116 of insulating material that extends from the armature of coil 108 to the contacts 115. The contacts 115 are connected in parallel with the contacts 92 of protective relay 90 so that closing of the contacts 115 completes the trip circuit for breakers B and C in the same manner as closing of the contacts 92. Thus, breakers B and C as well as A are tripped in response to the fault from the tank 23.

Figure 2:
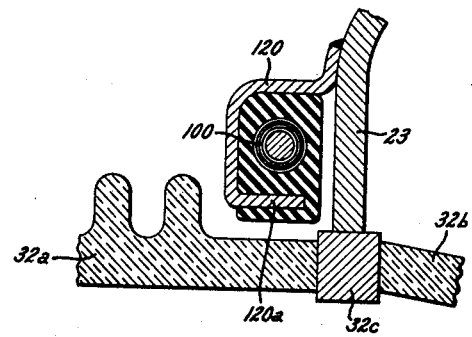
FIG. 2 is an enlarged detailed view of a porton of the circuit breaker assembly of FIG. 1.

Ordinarily, the secondary winding of a current transformer used in protective relaying is at ground potential and is insulated from its high voltage primary by expensive high voltage insulation. For example, the secondary windings 60 and 61 within the enclosure 22 are at ground potential and must be provided with insulation capable of withstanding the full line-to-ground voltage. In contrast to this conventional approach, my secondary windings 100 and 102 are at a high potential equal to that of the tank 23 and, moreover, require no appreciable high voltage insulation beyond that which is otherwise required in the breaker. In this regard, all of the voltage that is present between the primary conductor 30 and the tank 23 when the breaker is open is applied across the pressurized gas present in the bushing 27 or across the porcelain 32a or 32b. A metallic shield 120, which is electrically connected to the tank envelops the secondary winding 100 and prevents any portion of this voltage from being applied across the minor insulation provided immediately about the secondary winding 100. Referring to FIG. 2, it is noted that the shield 120 extends at 120a along the inner periphery of the winding 100 to assure that tank voltage is present in this region and that no portion of the line-to-tank voltage is applied across the portion of the insulation about winding 100 disposed radially inwardly of the shield 120. Any voltage that is present between the circuit breaker terminal 59 and the tank 23 is applied along the length of the porcelain column 32a between the terminal 59 and the shield 120, which is at tank voltage. Substantially none of this voltage is applied across the minor insulation immediately surrounding the winding 100 itself inasmuch as the shield 120 places tank voltage between the terminal 59 and the insulation immediately surrounding the current transformer secondary winding 100. The other secondary winding 102 has a shield 122 corresponding to the shield 120 in all essential respects.

Referring to the detailed showing of FIG. 2, it should be noted that the portion 120a of the shield 120 that is disposed radially inward of the current transformer winding 100 is locally insulated from the tank 23. The only connection between the tank 23 and the portion 120a is through the outer periphery of the shield 120, i.e., outside the magnetic circuit of the current transformer winding 100. Thus, in the remote event that a fault should take place to the shield 120, say from a tank of an adjacent phase, the resulting fault current would flow to the tank 23 via a path outside the magnetic circuit of the winding 100 rather than via a path located inside the magnetic circuit. This would mean that the current transformer winding 100 would see no appreciable portion of this fault current. If the fault current flowed out of the tank 23 through the other primary conductor 31 then the other current transformer winding 102 would see full fault current and the differential circuit 110 would respond by causing coil 108 to operate in the desired manner. If, on the other hand, the fault current were allowed to flow to the tank through portion 120a of the shield 120 disposed internally of the winding 100, then the winding 100 could see nearly the full fault current. Since winding 102 would also see full current, there would be a strong probability that the coil 108 would not be operated. To preclude this probability, I force any current to the shield 120 to flow to the tank 23 via a path outside the magnetic circuit of the winding 100. This accounts for the local insulation between portion 120a and the tank 23. The shield 122 about winding 102 is constructed in substantially the same manner as shield 120.

It should be apparent that although the differential circuit 110 extends between opposite sides of the contacts of the circuit breaker, it does not constitute a short circuit or reduced insulation path between the terminals of the circuit breaker when its contacts are open. In this respect, the differential circuit is insulated from the primary leads to the circuit breaker by the same structure that insulates the metallic tank 23 therefrom. Since the differential circuit 110 extends merely between the ends of metallic tank 23, it constitutes no more of a bridge between the opposite terminals of the breaker than the tank 23 itself, and the tank 23 is required even in the absence of the differential circuit. Thus, the presence of the differential circuit 110 does not impair the ability of the breaker to perform its intended function of electrically isolating its terminals from each other upon opening.

Figure 3:
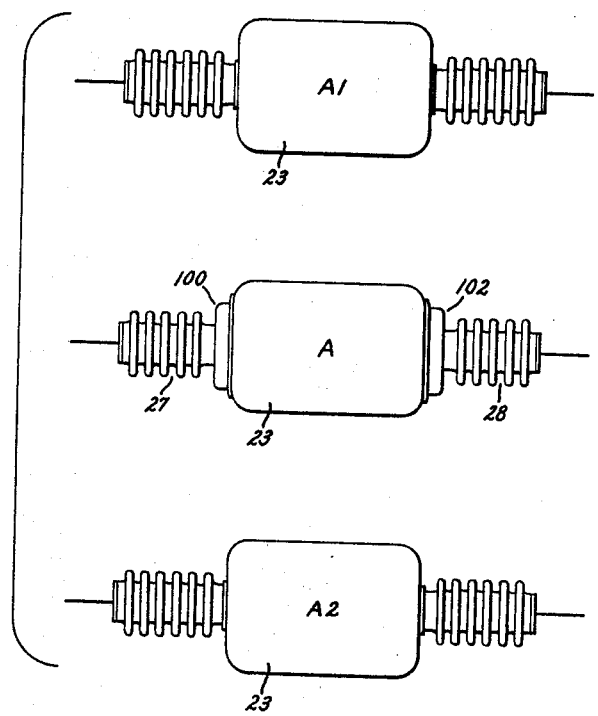
FIG. 3 is a diagrammatic view illustrating one way of applying my invention in a polyphase circuit.

To facilitate an understanding of my invention, I have in the above portion of the description dealt only with a single phase of a power system. It is to be understood, however, that my invention will normally be used in a polyphase system, and thus circuit breaker assemblies corresponding to assembly A will be located adjacent the assembly A and will be similarly connected in the other phases of the power system. A plan view of such a polyphase circuit is shown in FIG. 3, with the circuit breaker assemblies of the various phases being designated A, A1, and A2. These assemblies should be sufficiently spaced from each other to minimize the possibility that any fault that does occur will be from phase-to-phase. In the remote event that such a fault does occur, it most likely will involve one of the tanks 23 since these are the parts closest together. The secondary windings 100 and 102 described hereinabove will assure the desired relaying for such faults.

The chances that any such phase-to-phase faults will not involve the tank 23 of the center phase are relatively slight since the center phase is physically interposed between the two outer phases. Therefore, it is ordinarily satisfactory in a polyphase breaker such as shown in FIG. 3 if only the center phase is provided with the above-described windings 100 and 102. These windings can sense a fault between tanks of assemblies A' and A and between the tanks of assemblies A2 and A. The current transformer secondaries 100 and 102 can initiate simultaneous operation of all three phases of the circuit breaker in response to such a condition.

In certain applications it may be desirable to provide all three phases with current transformer windings 100 and 102 of the type disclosed hereinabove, and the invention in its broader aspects is intended to cover such an arrangement.

While I have shown and described particular embodiments of my invention, it will be obvious to those skilled in the art that various changes and modifications may be made without departing from the invention in its broader aspects. I, therefore, intend in the appended claims to cover all such changes and modifications as fall within the true spirit and scope of my invention.

What I claim as new and desire to secure by United States Letters Patent is:

1. An electric circuit breaker comprising a tank at high potential, two pairs of separable contacts electrically connected in series and disposed within said tank for effecting circuit interruption inside the tank, means for electrically connecting one contact of each of said pairs to said tank, a pair of insulating bushings projecting into said tank for carrying currents to and from said contacts, a current transformer primary winding at one electrical side of said contacts, first and second current transformer secondary windings inductively coupled to said primary winding for defining the boundaries of a pair of protective zones, one of which includes the power circuit at one side of said circuit breaker and the other of which includes the power circuit at the other side of said circuit breaker, a third current transformer secondary winding having a magnetic circuit surrounding one of said insulating bushings, a fourth current transformer secondary winding having a magnetic circuit surrounding the other of said insulating bushings, means for connecting said third and fourth secondary windings in a differential protective circuit which is sensitive to a predetermined difference in the currents entering and leaving said tank through said two bushings, means connected in said differential protective circuit for causing opening of said circuit breaker in response to a difference in the currents entering and leaving said tank through said bushings, each of the secondary windings about said bushings being at substantially the potential of said tank.

2. The structure of claim 1 in combination with a pair of metallic shields respectively enveloping said third and fourth current transformer windings, means for electrically connecting said shields to said tank, and local insulation between each of said shields and said tank for forcing any current from either of said shields to said tank to follow a path to the tank located outside the magnetic circuit of the particular current transformer winding enveloped by the shield.

3. In the combination of claim 1, a hollow insulating column on which said tank is mounted and a housing at the opposite end of said insulating column from said tank, said primary winding comprising a pair of series-connected arms forming a loop connected in series with said contacts, one of said arms extending through a portion of said insulating column into said housing and the other of said arms extending from said housing back through a portion of said insulating column, said first and second current transformers being disposed within said housing, a fifth current transformer secondary winding disposed externally to said insulating column and housing and having a magnetic circuit disposed externally to said insulating column and housing and mounted about both arms of said primary winding so that said fifth winding is normally deenergized, means responsive to energization of said fifth winding for initiating a predetermined protective function, and means for forcing substantially all faults ocurring within said column and said housing to follow a path to ground so located that the fault produces a net flow of current in the region disposed internally of the magnetic circuit of said fifth winding to energize said fifth winding.

4. An electric circuit breaker assembly comprising a tank at high potential, two pairs of separable contacts electrically connected in series and disposed within said tank for effecting circuit interruption inside the tank, means for connecting one contact of each of said pairs to said tank, a pair of insulating bushings projecting into said tank for carrying currents to and from said contacts, a current transformer primary winding at one electrical side of said contacts, first and second current transformer secondary windings inductively coupled to said primary winding for defining the boundaries of a pair of protective zones, one of which includes the power circuit at one side of said circuit breaker and the other of which includes the power circuit at the other side of said circuit breaker, a third current transformer secondary winding having a magnetic circuit surrounding one of said insulating bushings, a fourth current transformer secondary winding having a magnetic circuit surrounding the other of said insulating bushings, means comprising a differential protective circuit interconnecting said third and fourth secondary windings for causing opening of said circuit breaker in response to a predetermined difference in the current entering and leaving said tank through said bushings.

5. The combination of claim 4 in which said last mentioned means causes isolation of said circuit breaker from the power circuits at both electrical sides thereof in response to a predetermined difference in the currents entering and leaving said tank through said bushings.

6. An electric circuit breaker assembly comprising a tank at high potential, two pairs of separable contacts electrically connected in series and disposed within said tank for effecting circuit interruption inside the tank, means for connecting one contact of each of said pairs to said tank, a pair of insulating bushings projecting into said tank for carrying currents to and from said contacts, a first current transformer secondary winding having a magnetic circuit located externally of one of said insulating bushings, a second current transformer secondary winding having a magnetic circuit located externally of the other of said insulating bushings, means comprising a differential protective circuit interconnecting said first and second secondary windings for causing opening of said circuit breaker in response to a predetermined difference in the current entering and leaving said tank through said bushings.

7. The structure of claim 6 in combination with a pair of metallic shields respectively enveloping said first and second current transformer windings, means for electrically connecting said shields to said tank, and local insulation between each of said shields and said tank for forcing any current from either of said shields to said tank to follow a path to the tank located outside the magnetic circuit of the particular current transformer winding enveloped by the shield.

8. A three-phase circuit breaker assembly comprising three circuit breakers for connection in the center and two outer phases, respectively, of a three-phase alternating power system, the circuit breaker of said center phase being constructed as set forth in claim 1.

References Cited by the Examiner
UNITED STATES PATENTS

| | | | |
|---|---|---|---|
| 2,804,576 | 8/57 | Coggeshall et al. | 317—27 X |
| 2,931,951 | 4/60 | Wilson | 317—15 |
| 3,032,689 | 5/62 | Baker et al. | 317—15 |
| 3,105,172 | 9/63 | Abel et al. | 317—15 |

SAMUEL BERNSTEIN, *Primary Examiner.*